Patented Apr. 14, 1942

2,279,514

UNITED STATES PATENT OFFICE 2,279,514

ACETAMIDINE ANTHRANILATE AND ITS PREPARATION

Garnet Philip Ham, Old Greenwich, and Robert Bowling Barnes, Stamford, Conn., assignors to American Cyanamid Company, New York, N. Y., a corporation of Maine No Drawing. Application April 29, 1941, Serial No. 390,924

3 Claims. (Cl. 260—501)

This invention relates to acetamidine anthranilate and to methods of preparing the same.

Acetamidine anthranilate is, we believe, an amidine salt of the formula

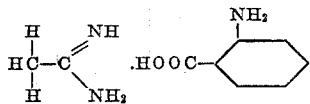

and in purified form occurs as a crystalline white salt having rhombohedral shaped prisms. It has a molecular weight of 195.16, a melting point of 170–171° C. and a 1% aqueous solution at 75° C. has a pH of 7.5. The refractive indices of the crystals determined in two extinction directions are $n_1$, 1.519; $n_2$, 1.75–1.76. As indicated by the formula the compound is a true addition product; that is to say, the carboxylic acid group of anthranilic acid adds on to the organic base, acetamidine, to form a salt. We believe that this addition takes place at one of the nitrogen atoms of acetamidine, the nitrogen atom undergoing a change of valence of from 3 to 5. Although this has not been established as a proven fact the formula represents the customary method of designating addition products of this nature.

Acetamidine anthranilate may be used as a stabilizer or anti-oxidant for many materials which are subject to deterioration by light or oxygen such as fats and oils, aldehydes, gasoline, disubstituted guanidines and the like. Acetamidine anthranilate is particularly valuable as a secondary oxidation inhibitor in photographic developers. Photographic developers generally contain reducing agents such as hydroquinone, phenylene diamine, methyl p-aminophenol hydrochloride, and primary anti-oxidants such as sodium sulfiite, potassium meta-bisulfite and the like. These primary anti-oxidants are limited in their effectiveness to prevent deterioration of the photographic developing solution by light or air but when acetamidine anthranilate is added to the developer as a secondary inhibitor the effects of oxidation on the solution are very considerably reduced.

Acetamidine anthranilate could be prepared by simply neutralizing anthranilic acid with acetamidine. However, acetamidine is very unstable and is not ordinarily isolated as such, and therefore in following this method the acetamidine is prepared in solution by one of several methods known to the art and reacted immediately with anthranilic acid. This method is illustrated in Example 2 in which the hydrochloride from acetamidine hydrochloride is removed with $NH_3$ and the free acetamidine subsequently neutralized with anthranilic acid.

Our preferred method of preparing acetamidine anthranilate is, however, to react an acetamidine salt such as acetamidine hydrochloride, bromide, sulfate, phosphate or the like with anthranilic acid in the presence of an alkali such as NaOH, KOH, or $NH_3$. During this reaction an inorganic salt such as NaCl, KBr, ammonium chloride, etc., depending upon the particular amidine salt and alkali employed in the process, is formed. When the reaction is conducted in an anhydrous medium such as 95–100% alcohol the inorganic salt precipitates out of solution and is removed by decantation or filtration. The acetamidine anthranilate which also forms during the course of the reaction is then later removed from the reaction medium, washed and purified if necessary.

The preparation of acetamidine anthranilate will now be illustrated in greater detail by means of the following specific examples which are given merely by way of illustration and are not intended to be construed as limiting the preparation of my new compound to the exact details or the specific conditions described.

Example 1

18 parts by weight of anthranilic acid was dissolved in 78 parts by weight of ethyl alcohol (99%) and mixed with a solution of 5.2 parts by weight of NaOH in 78 parts by weight of ethyl alcohol (99%). This was added to 12.3 parts by weight of acetamidine hydrochloride in 156 parts by weight of anhydrous ethyl alcohol and the mixture was shaken vigorously for 15 minutes and allowed to stand for 15 minutes. A fine, white precipitate of NaCl formed upon standing and was removed by filtration. After standing overnight at room temperature a second crop of crystals was found in the mother liquor. These were filtered and washed until they gave no test for chloride ions. The product melted at 171° C. with decomposition and on analysis was found to contain 55.36% carbon, 6.49% hydrogen and 21.63% nitrogen, indicating acetamidine anthranilate of above 99% purity.

Example 2

29.2 parts by weight of anthranilic acid was added to a solution of 20 parts by weight of acetamidine hydrochloride in an excess of alcoholic $NH_3$. After standing for 4 or 5 hours a white crystalline precipitate formed. The material was recrystallized from alcohol and two fractions obtained, one of which was ammonium chloride and the other acetamidine anthranilate of a slightly lesser degree of purity than the product obtained by the process described in Example 1.

What we claim is:
1. Acetamidine anthranilate.
2. A method of preparing acetamidine anthranilate which comprises reacting an acetamidine salt with anthranilic acid in the presence of an alkali.
3. A method of preparing acetamidine anthranilate which comprises reacting an acetamidine hydrochloride with anthranilic acid in the presence of an alkali.

GARNET PHILIP HAM.
ROBERT BOWLING BARNES.